United States Patent
Barzilay et al.

(10) Patent No.: US 9,344,487 B2
(45) Date of Patent: May 17, 2016

(54) METHOD FOR NETWORKING CPAAS COMPONENTS FOR APPLICATION ON-BOARDING

(71) Applicants: Sivan Barzilay, Tel-Aviv (IL); Islam Heralla, Kufur-Kassem (IL); Ranny Haiby, Herzliya (IL)

(72) Inventors: Sivan Barzilay, Tel-Aviv (IL); Islam Heralla, Kufur-Kassem (IL); Ranny Haiby, Herzliya (IL)

(73) Assignee: Alcatel Lucent, Boulogne-Billancourt (FR)

( * ) Notice: Subject to any disclaimer, the term of this patent is extended or adjusted under 35 U.S.C. 154(b) by 416 days.

(21) Appl. No.: 13/803,910

(22) Filed: Mar. 14, 2013

(65) Prior Publication Data

US 2014/0280434 A1 Sep. 18, 2014

(51) Int. Cl.
G06F 15/173 (2006.01)
H04L 29/08 (2006.01)
G06F 9/50 (2006.01)
G06F 15/16 (2006.01)
H04L 12/28 (2006.01)

(52) U.S. Cl.
CPC .............. *H04L 67/10* (2013.01); *G06F 9/5005* (2013.01); *H04L 67/16* (2013.01)

(58) Field of Classification Search
CPC ........ H04L 67/10; H04L 67/16; G06F 9/5005
USPC ................................... 709/226, 227; 370/401
See application file for complete search history.

(56) References Cited

U.S. PATENT DOCUMENTS

| | | | |
|---|---|---|---|
| 8,514,868 B2 * | 8/2013 | Hill ............................... | 370/401 |
| 8,584,131 B2 * | 11/2013 | Wong et al. .................... | 718/104 |
| 8,904,477 B2 * | 12/2014 | Barton et al. ..................... | 726/1 |
| 8,995,301 B1 * | 3/2015 | Miller et al. ................... | 370/254 |
| 9,146,781 B2 * | 9/2015 | Wada ..................... | G06F 3/1204 |
| 2014/0108665 A1* | 4/2014 | Arora .................... | H04L 67/141 |
| | | | 709/227 |
| 2014/0241247 A1* | 8/2014 | Kempf et al. ................. | 370/328 |

* cited by examiner

*Primary Examiner* — Wen-Tai Lin
(74) *Attorney, Agent, or Firm* — Kramer & Amado, P.C.

(57) ABSTRACT

Various exemplary embodiments relate to a method and related network node including one or more of the following: receiving, by a cloud management system, a request for application deployment; provisioning a new application manager within a cloud computing system based on the request; configuring the new application manager to belong to a first virtual private network (VPN), wherein the cloud management system also belongs to the first VPN; and configuring the new application manager to belong to a second VPN, wherein the new application manager is configured to send and receive data messages via the first VPN and the second VPN.

20 Claims, 5 Drawing Sheets

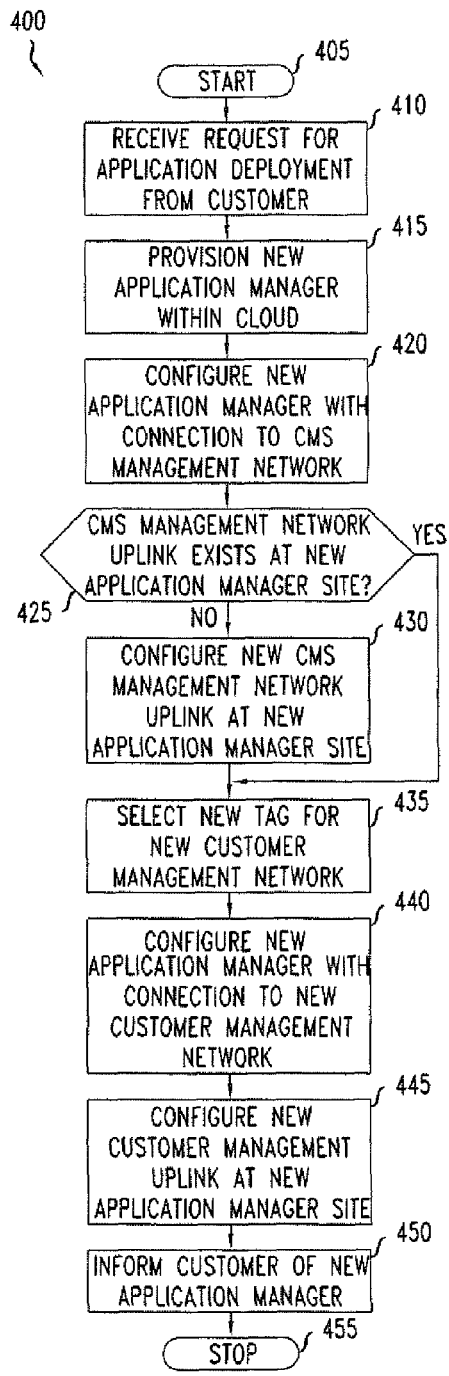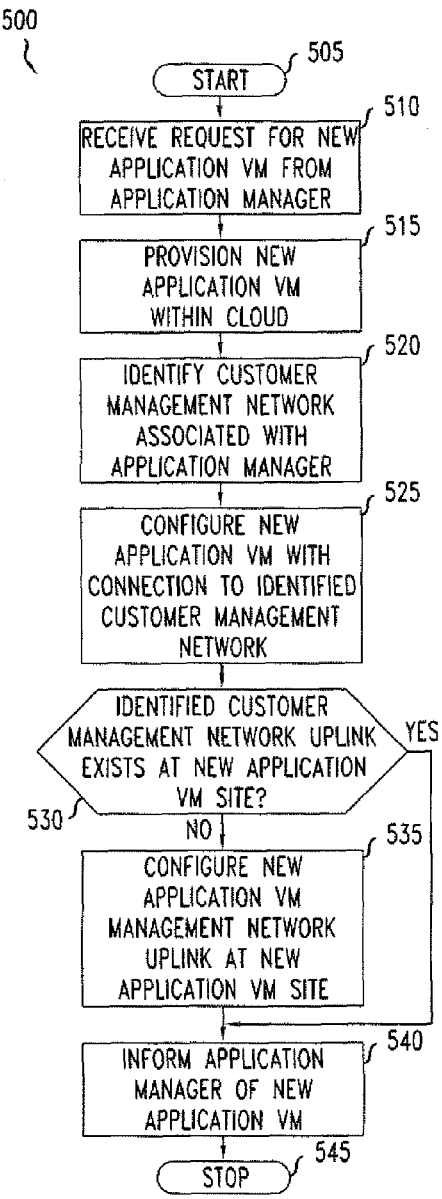

METHOD FOR NETWORKING CPAAS COMPONENTS FOR APPLICATION ON-BOARDING

TECHNICAL FIELD

Various exemplary embodiments disclosed herein relate generally to cloud computing.

BACKGROUND

In various cloud-computing systems, such as carrier-grade platform-as-a-service (cPaaS) systems, customers are able to deploy an application on a distributed cloud. In some of these deployments various virtual machines (VMs) for managing and providing the application may be provisioned on hardware located in geographically disparate data centers. In some of these applications, these VMs are required to communicate with each other. Such communication is typically via a public network such as the Internet. As such, in many systems, each VM may be given a public IP address to use in communicating with other application VMs, application managers, cloud management systems, customers, and other devices.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method for establishing a cloud application including: receiving, by a cloud management system, a request for application deployment; provisioning a new application manager within a cloud computing system based on the request; configuring the new application manager to belong to a first virtual private network (VPN), wherein the cloud management system also belongs to the first VPN; and configuring the new application manager to belong to a second VPN, wherein the new application manager is configured to send and receive data messages via the first VPN and the second VPN.

Various exemplary embodiments relate to a cloud management system including: a memory; and a processor in communication with the memory, the processor being configured to: receive a request for application deployment; provision a new application manager within a cloud computing system based on the request; configure the new application manager to belong to a first virtual private network (VPN), wherein the cloud management system also belongs to the first VPN; and configuring the new application manager to belong to a second VPN, wherein the new application manager is configured to send and receive data messages via the first VPN and the second VPN.

Various exemplary embodiments relate to a non-transitory machine-readable storage medium encoded with instructions for establishing a cloud application including: instructions for receiving, by a cloud management system, a request for application deployment; instructions for provisioning a new application manager within a cloud computing system based on the request; instructions for configuring the new application manager to belong to a first virtual private network (VPN), wherein the cloud management system also belongs to the first VPN; and instructions for configuring the new application manager to belong to a second VPN, wherein the new application manager is configured to send and receive data messages via the first VPN and the second VPN.

Various embodiments additionally include receiving, by a cloud management system, an additional request for application deployment; provisioning an additional new application manager within the cloud computing system; configuring the additional new application manager to belong to the first virtual private network (VPN); and configuring the additional new application manager to belong to a third VPN, wherein the new application manager is configured to send and receive data messages via the first VPN and the third VPN.

Various embodiments additionally include configuring a new VPN uplink for at least one of the first VPN and the second VPN at a site of the new application manager.

Various embodiments additionally include providing a gateway to a public network; and configuring the new application manager to transmit messages bound for the public network to the gateway via the first VPN.

Various embodiments additionally include provisioning a first new application virtual machine (VM) within the cloud computing system; and configuring, through at least one configuration operation, the first new application VM to belong to each of a first set of VPNs, wherein the second VPN belongs to the first set of VPNs, wherein the first new application VM is configured to send and receive data messages via the first set of VPNs.

Various embodiments are described wherein the first set of VPNs includes at least one additional VPN other than the second VPN, further including: provisioning a second new application VM within the cloud computing system; and configuring, through at least one configuration operation, the second new application VM to belong to each of a second set of VPNs, wherein the second VPN and the additional VPN belongs to the second set of VPNs, wherein the second new application VM is configured to send and receive data messages via the second set of VPNs.

Various embodiments additionally include configuring a first new VPN uplink for the additional VPN at a site of the first new VM, and configuring a second new VPN uplink for the additional VPN at a site of the second new VM.

BRIEF DESCRIPTION OF THE DRAWINGS

In order to better understand various exemplary embodiments, reference is made to the accompanying drawings, wherein:

FIG. 4 illustrates an exemplary method for establishing an application manager within a cloud;

FIG. 5 illustrates an exemplary method for establishing an application virtual machine within a cloud.

To facilitate understanding, identical reference numerals have been used to designate elements having substantially the same or similar structure or substantially the same or similar function.

DETAILED DESCRIPTION

Figure 1:
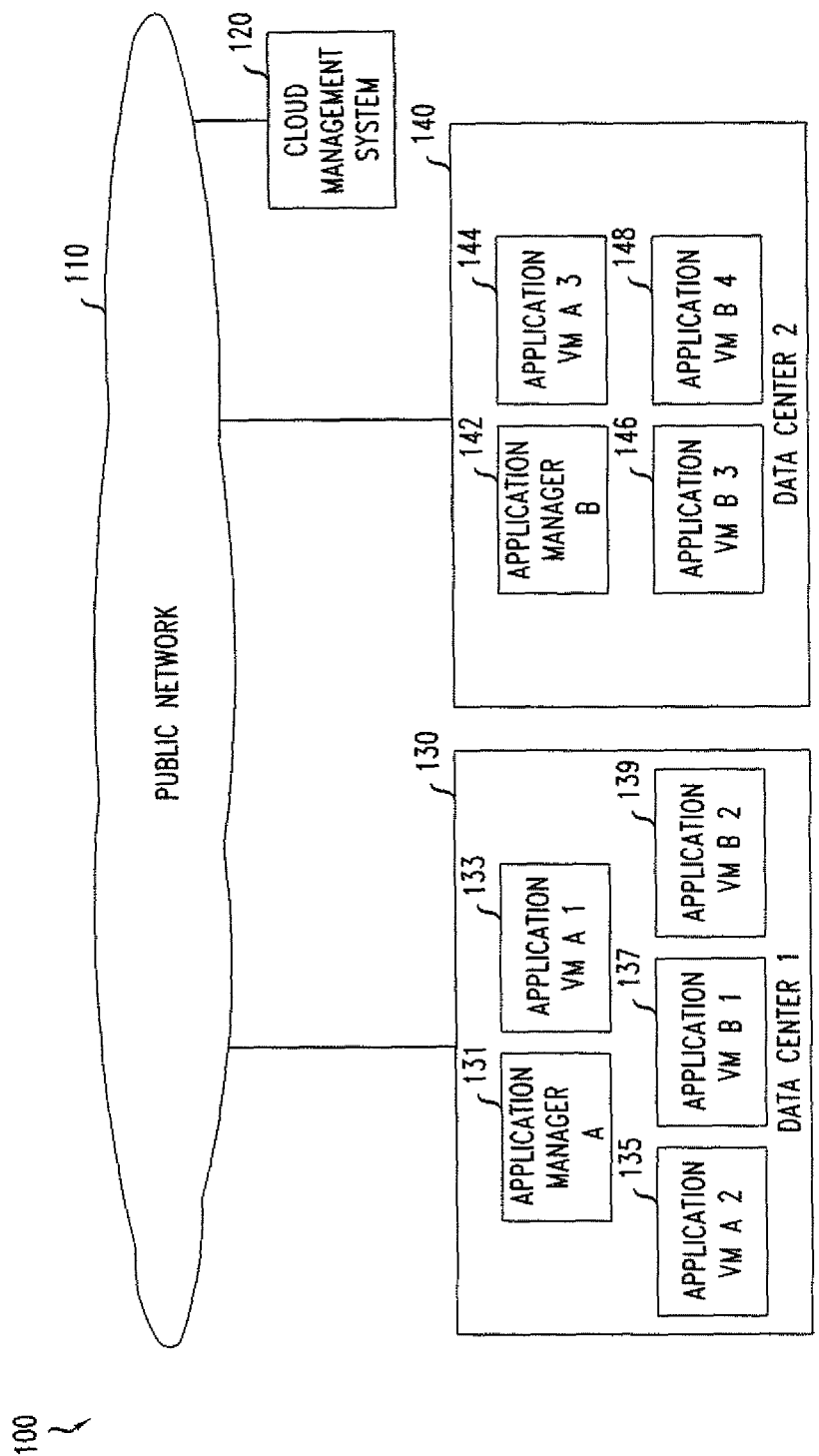
FIG. 1 illustrates an exemplary network for providing cloud-based applications.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

It may be undesirable in many cloud-based applications to expose some or all components associated with the application to a public network. For example, exposing the back end database servers of a web-accessible application may be associated with a security risk of undesired access which may result in unwanted modification to the database by others. As another example, some applications may not interface with users on the public network and, instead, would benefit from the increased privacy afforded by connecting solely to private networks. These goals of privacy, however, are difficult to attain when the components of the application are geographically distributed yet require intercommunication.

Referring now to the drawings, in which like numerals refer to like components or steps, there are disclosed broad aspects of various exemplary embodiments.

FIG. 1 illustrates an exemplary network 100 for providing cloud-based applications. The network 100 may include a public network 110 for facilitating communications between various components of the network 100. In various embodiments, the public network 110 may include the Internet. It will be apparent that, while the various components are illustrated as being directly connected to the public network 110, various intermediate devices such as routers and switches (not shown) may facilitate such connections.

The network 100 may include a cloud management system (CMS) 120 and multiple data centers 130, 140. In various embodiments, the cloud management system 120 may be a standalone device dedicated to managing the various hardware and software provisioned within a cloud system. The cloud management system 120 may thus include a server, blade, or other computing system. In various embodiments, the cloud management system 120 may include one or more virtual machines provisioned among the cloud hardware located at the various data centers 130, 140.

The cloud management system 120 may perform various functions relating to providing cloud-based services. For example, in some embodiments, the cloud management system 120 may provide infrastructure as a service (IaaS) and may support application on-boarding (AOB). As such, the cloud management system 120 may receive requests to deploy an application within the cloud, obtain hardware usage within the cloud, establish one or more virtual machines (VMs) on the hardware, or inform the requestor that the VMs have been established.

The data centers 130, 140 may constitute geographically separated sites that host hardware for supporting cloud-based systems. As such, the data centers may include multiple blades, servers, or other computer systems for hosting VMs. It will be understood that, while two data centers are illustrated, various networks may include greater or fewer data centers.

As shown, the network 100 may host two applications: application A and application B. These applications may be owned or operated by the same customer or by different customers. Application A may utilize four virtual machines, an application manager 131 and two application VMs 133, 135 hosted in data center 1 130 and one application VM 144 hosted in data center 2 140. Likewise, application B may utilize five virtual machines, two application VMs 137, 139 hosted in data center 1 130 and one application manager 142 and two application VMs 146, 148 hosted in data center 2 140. These various components may communicate with each other, the cloud management system 120, customer devices, or other devices to provide the services associated with their respective applications.

The application managers 131, 142 may include virtual machines capable of managing an application deployed within the cloud. In various embodiments, the application managers 131, 142 may constitute cPaaS managers (cPMs). The application managers 131, 142 may perform various functions such as requesting infrastructure allocation or deallocation from the CMS 120, loading application VMs on the infrastructure, or monitoring application performance on the application VMs. As such, the application managers 131, 142 may both deploy new applications and scale established applications within the cloud.

The application VMs 133-139, 144-148 may be virtual machines configured to provide one or more functions related to an application. These virtual machines may be provided, selected, or otherwise specified by the customer for the purposes of providing the application and, as such, may vary from application to application. For example, if application A is an e-commerce web-site, application VM A 1 133 and application VM A 3 144 may be provide a web-server frontend, while application VM A 2 135 may provide a database backend. As another example, if application B is a distributed computing application configured to divide and process a large data set, application VMs 137, 139, 146, 148 may each provide processing of data chunks delivered from the data set. Various additional applications and types of VMs will be apparent.

It will be understood that, while exemplary network 100 illustrates various virtual machines for providing two different applications, numerous additional applications may be supported. As such, the data centers 130, 140, as well as other data centers not illustrated, may support numerous additional application managers and application VMs (not shown) associated with such other applications.

As noted above, it may be undesirable or unnecessary to provide the various virtual machines 131-139, 142-148 of the exemplary network 100 with access to the public network. For example, the customer may prefer that an application manager, a database backend, distributed processing node, or other VM that does not interact with many devices outside of the application be inaccessible from the public network 110. This leaves the challenge, however, of enabling communication between the various components associated with each application.

Figure 2:
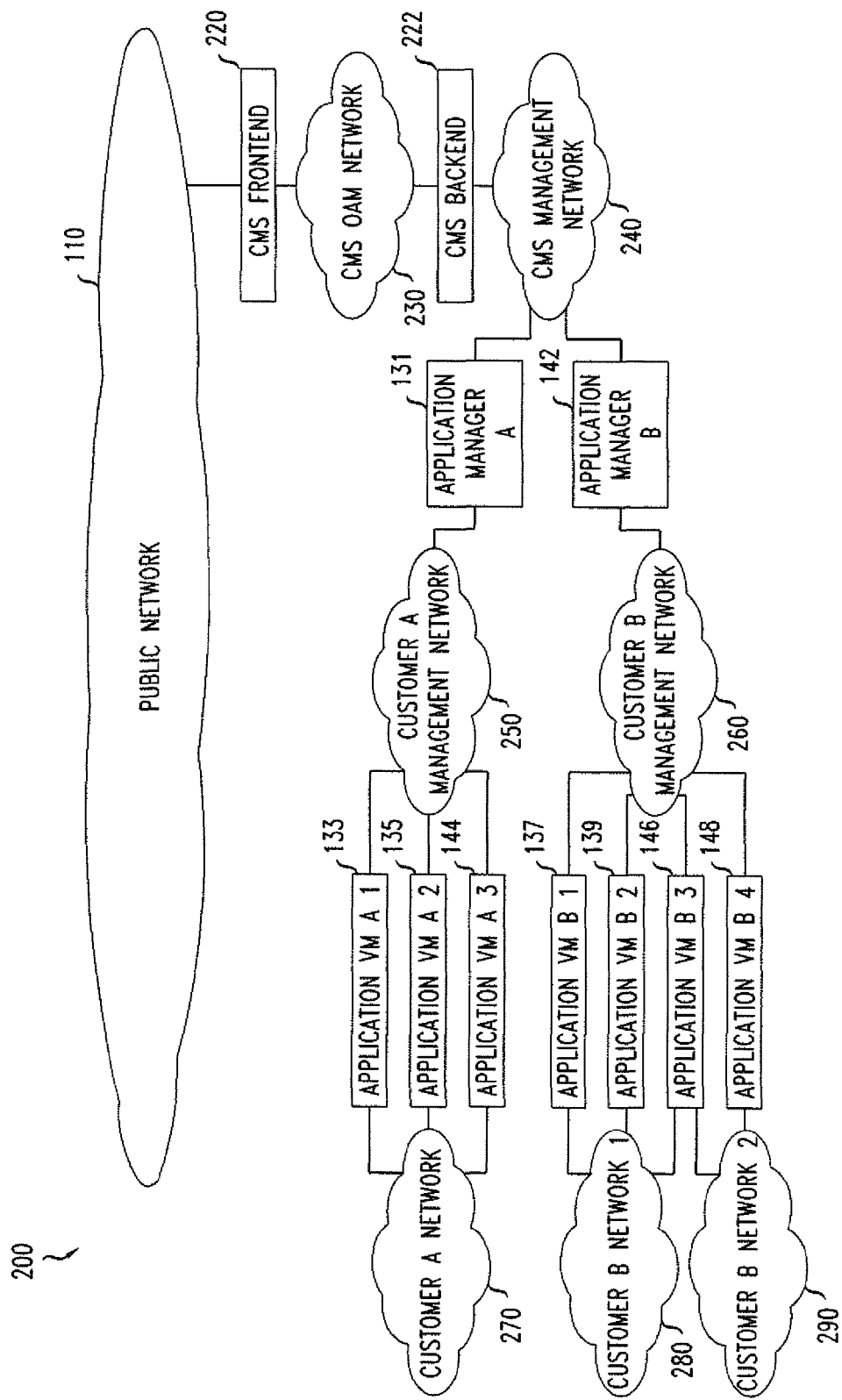
FIG. 2 illustrates an exemplary logical network for providing cloud-based applications.

FIG. 2 illustrates an exemplary logical network 200 for providing cloud-based applications. As will be described, the logical network 200 facilitates communication between the various components of the two cloud-based applications of exemplary network 100 without exposing those components to the public network 110.

As mentioned above, the CMS 120 may include multiple devices such as a CMS frontend 220 and a CMS backend 222 in communication via a CMS operations, administration, and maintenances (OAM) network 230. The CMS frontend 220 may receive requests from and send notifications to customers, while the CMS backed 222 may coordinate with the application managers 131, 142 to establish the requested applications. The CMS OAM network 230 may be a physical private network connecting the CMS frontend 220 and the CMS backend 222 such as, for example, an onsite LAN. Alternatively, the CMS OAM network 230 may be established as a virtual private network (VPN) which may traverse the public network 110. In this manner, the CMS frontend 220 and CMS backend 222 may communicate via the public network without providing at least one of the devices with a public presence on the public network 110.

The CMS backend 222 may communicate with each of the application managers 131, 142 via a CMS management network 240. The CMS management network 240 may constitute a VPN established at the time the CMS 120 is installed. As each application manager 131, 142 is established, the new application manager 131, 142 may be configured to communicate via the existing CMS management network 240. Further, the CMS 120 may also establish uplinks for connecting the CMS management network 240 to geographically-separated sites when useful. The application managers 131, 142 may use the CMS management network 240 to transmit requests for infrastructure to the CMS backend 222 when deploying or scaling an application. As a virtual private network, various communications transmitted via the CMS management network 240 may traverse the public network 110. However, because such communications occur over a VPN, the various components need not be provided with a public IP address.

In a similar manner, each application manager 131, 142 may be provided with an additional VPN. As shown, application manager A 131 may be configured to communicate over Customer A Management Network 250 while application manager B 142 may be configured to communicate over customer B management network 260. The application VMs 133-139, 144-148 may also be configured to communicate according to the appropriate customer management network 250, 260. Either the CMS 120 or the appropriate application manager A 131, 142 may configure each of the application VMs 133-139, 144-148 to communicate via the appropriate customer management network 250, 260 at the time of application VM establishment. Further, the CMS 120 or application managers 131, 142 may also establish uplinks for connecting the customer managements networks 250, 260 to geographically-separated sites when useful. The application managers 131, 142 may communicate with the application VMs 133-139, 144-148 via the respective customer management networks 250, 260 to install application code, monitor load and performance, and perform other application management functions. As described above with respect to the CMS management network 240, the customer management networks 250, 260 may facilitate communication between application managers and application VMs without requiring the exposure of these VMs to the public network 110 such as, for example, by providing a public IP address.

To facilitate inter-application VM communication, each application may be provided with one or more customer networks 270, 280, 290. In various embodiments, the customer may create such networks to provide connectivity between application VMs. Alternatively, the customer networks 270, 280, 290 may be created automatically by the CMS 120 or appropriate application manager 131, 142 upon application deployment. For example, a recipe file executed by an application manager 131, 142 may specify that a VPN should be established between various VMs that belong to the application. Further, the CMS 120, application managers 131, 142, or customer may also establish uplinks for connecting the customer networks 270, 280, 290 to geographically-separated sites when useful.

As used herein, the term VPN will be understood to encompass any virtual private network such as, for example, virtual local area networks (VLAN), virtual private LAN services (VPLS), virtual private routed networks (VPRNs), pseudowires, multiprotocol label-switched paths (MPLS), and other tunnels. While various embodiments described herein relate to configuring VPNs as VLANS, various modifications for using other types of VPN will be apparent.

In various embodiments, the logical network 200 may include one or more gateway devices for providing access via the public network 110. For example, the CMS frontend 220 may act as a gateway or a separate gateway device may be attached to the CMS OAM Network 230 or one of the other VPNs 240, 250, 260, 270, 280, 290. The gateway may enable communication between the various VMs 131-139, 142-148 and devices on the public network without associating a public IP with any of the VMs 131-139, 142-148. For example, if application VM A 1 133 wishes to serve data to a customer attached to the public network 110, the application VM 133 may send the data through customer A management network 250, application manager A 131, CMS management network 240, CMS backend 222, CMS OAM network 230, CMS frontend 220 (acting as a gateway) and onto the public network 110. In various embodiments, the gateway may perform functions such as traffic shaping, policy enforcement, or firewall services. Various configurations appropriate for establishing such gateway functionality will be apparent.

In various embodiments, it may be advantageous to configure one or more of the devices on the logical network 200 to communicate only via those VPNs to which the device is attached and not directly via the public network 110. For example, the application manager A 131 may be configured to communicate only via the CMS management network 240 and the customer A management network 250. Such a configuration may provide greater privacy to the application manager A 131.

Figure 3:
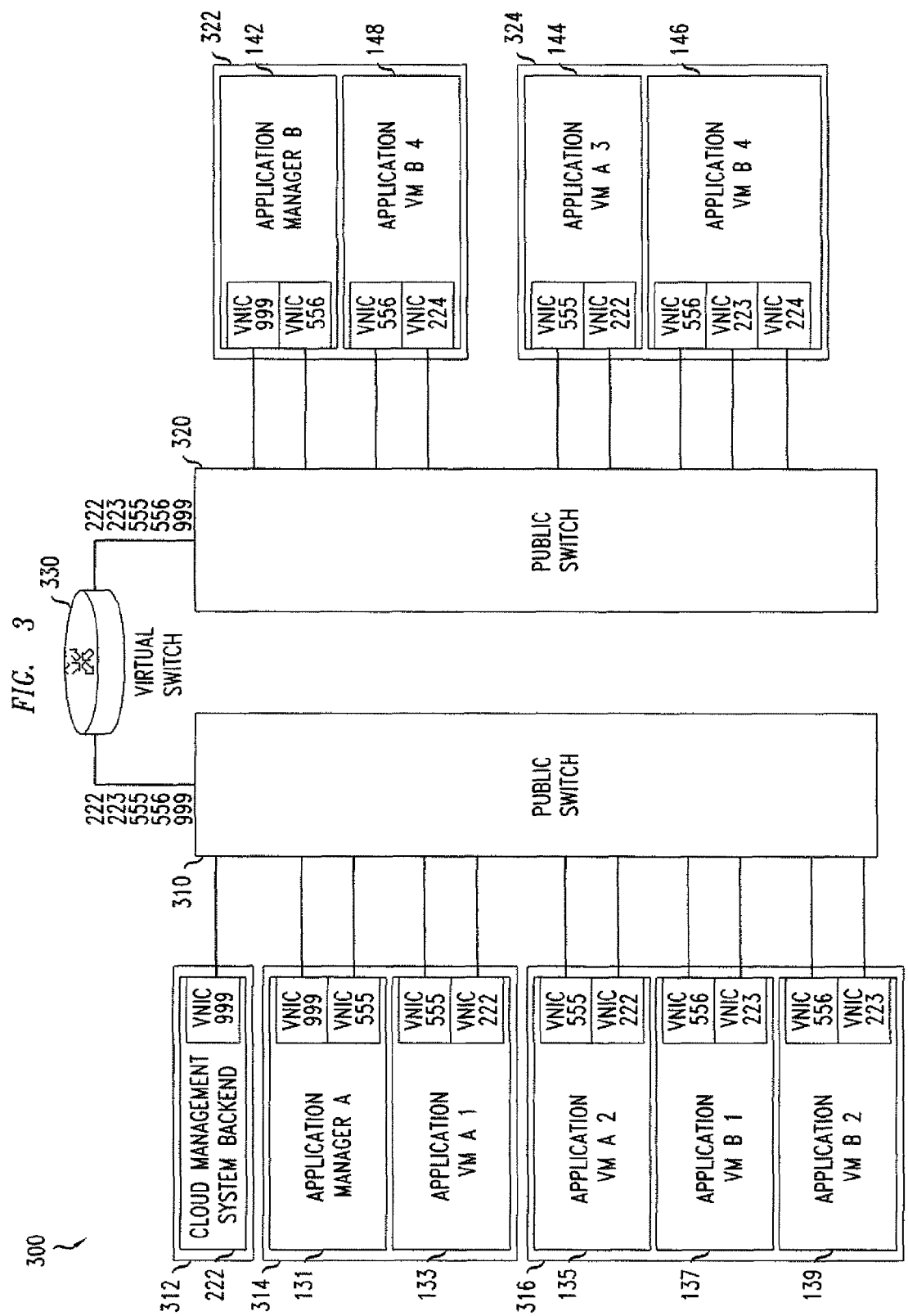
FIG. 3 illustrates an exemplary hardware and software configuration for providing cloud-based applications.

FIG. 3 illustrates an exemplary hardware and software configuration 300 for providing cloud-based applications. The exemplary configuration 300 may describe a configuration of exemplary network 100 for the purpose of establishing the exemplary logical network 200. As illustrated, the cloud network 100 may include multiple hardware devices such as blades 312, 314, 316, 322, 324. It will be appreciated that the various virtual machines and other software components may be deployed on other hardware such as servers and other computing systems. Blades 312, 314, 316 may be located in data center 1 130 while blades 322, 324 may be located in data center 2 140. The blades in each data center may be connected by a backplane private router (not shown) to enable local communication and management.

The data centers 130, 140 may also have at least one public switch 310, 320 to which the blades are connected to the public network 110. For example, in data center 1 130, blades 312, 314, 316 may be connected to public switch 310, while in data center 2 140, blades 322, 324 may be connected to public switch 320.

The public switches 310, 320 may be configured to provide VPN service between the various data centers. As such, the public switches 310, 320 may each be configured with one or more uplinks for the various VPNs distributed across the date centers. For example, the public switches 310, 320 may both be configured to forward VLAN traffic having specified VLAN tags to each other over the public network, thereby establishing a "virtual switch" 330 between the two sites. As will be understood, various alternative uplinks may be utilized to establish a virtual switch 330 such as, for example, VPLS or VPRN. As illustrated, the public switches 310, 320 may be configured to pass any traffic including one of the VLAN tags "222," "223," "555," "556," or "999" to the other public switch 310, 320. It will be apparent in embodiments involving more than two sites, the virtual switch 330 may forward some or all of these VLAN tags to such other sites, depending on the configuration of the public switches 310, 320.

The various VMs 222, 131-139, 142-148 may be configured to run on the various blades 312-316, 322-324. Rather than providing the VMs 222, 131-139, 142-148 with unrestricted access to the network interfaces of the respective blades 312-316, 322-324, however, each VM 222, 131-139, 142-148 may be provided with one or more virtual network interface cards (VNICs) to enforce communication via the established VPNs and not unrestricted, public communication over the public network 110. For example, the CMS backend 222 and application managers 131, 142 may each be provided with a VNIC that attaches a VLAN tag of "999" to outgoing traffic. The VLAN tag "999" may have been selected by a CMS administrator to correspond to the CMS management network 240. Thus, traffic transmitted from one of these VNICs may be distributed to other such VNICs. For example, if the CMS backend 133 sends a message via its sole VNIC, the public switch 310 may forward the tagged message to application manager A 131. Further, based on uplink configuration, the public switch 310 may forward the message to the public switch 320 via the virtual switch 330. The public switch 320 may then deliver the message to application manager B 142 as well.

As another example, the application manager A 131 and the application A VMs 133, 135, 144 may each be provided with a VNIC configured to tag outgoing messages with VLAN tag "555." This tag may be selected by the CMS administrator to correspond to customer A management network 250. Likewise, the VLAN tag "556" may be selected for customer B management network, as shown in the VNICs configured for the application manager B 142 and application B VMs 137, 139, 146, 148. Customer A may select VLAN tag "222" to correspond to customer A network 270, while customer B may select VLAN tag "223" to correspond to customer B network 1 280 and VLAN tag "224" to correspond to customer B network 2, 290.

As illustrated with respect to VLAN tag "224" it may not be necessary to establish an uplink for every VPN. With the case of customer B network 2 290, both attached VMs 146, 148 may be located at the same data center 140. As such, the customer, CMS 222, or application manager 142 may refrain from configuring the associated uplink until a VM at some other site, such as data center 1 130, is attached to the VPN. It will also be apparent that in many embodiments, a private network may be established without use of a VPN. For example, instead of establishing the VLAN with tag "224" the application VMs connected to customer B network 2 290 may be configured to communicate with each other via the public switch 320 using untagged messages. These VMs 146, 148 may be kept private by refraining from providing them a public IP address or by configuring the switch 320 or another router device to block incoming and outgoing untagged traffic associated with the VMs 146, 148.

FIG. 4 illustrates an exemplary method 400 for establishing an application manager within a cloud. Exemplary method 400 may be performed by one or more of the components of exemplary network 100. For example, method 400 may be performed solely by the CMS 120, by the CMS 120 and one or more application managers 131, 142. Further, one or more steps may be performed manually by a cloud administrator or other user. For the purposes of illustration, the operation of method 400 will be described as being performed by CMS 120, though various modifications for performance by other devices will be apparent. It will be understood that the various steps described herein such as, for example, steps of provisioning or configuring, may be performed either directly or indirectly such as, for example, by instructing one or more other devices to directly perform the steps or substeps thereof.

Method 400 may begin in step 405 and proceed to 410 where the CMS 120 receives a request for application deployment from a customer. For example, the CMS 120 may receive, via the public network 110, a request to establish a new application manager for a cloud customer. In response, the CMS 120 may, in step 415, provision the new application manager within the cloud according to any appropriate methods. Then, in step 420, the CMS 120 may configure the new application manager with a connection to the CMS management network 240. For example, if the CMS management network 240 is a VLAN, the CMS 120 may configure the new application manager with a VNIC and the VLAN tag previously chosen for the CMS management network 240.

The CMS 120 may determine whether a new uplink should be configured in step 425 by determining whether an uplink for the site of the new application manager already has an uplink. For example, the CMS 120 may determine whether any other application managers already exist at the site of the new application manager. If so, the method 400 may skip to step 435. Otherwise, the CMS 120 may, in step 430, configure the new uplink by configuring a switch at the site of the new application manager to forward messages tagged for the CMS management network 240 to any other sites that also belong to the CMS management network. Step 430 may also include updating the configurations of any existing uplinks for the CMS management network 240 to forward traffic to the site of the new application manager. This step may include directly interfacing with the respective switches or sending commands to a network management system (NMS) (not shown).

In step 435, the CMS 120 may begin establishing the customer management network for the new application manager by selecting an unused tag for the new customer management network. Then, in step 440, the CMS 120 may proceed to configure the new application manager with a connection to a new VPN. For example, if the customer management network is a VLAN, the CMS 120 may configure the new application manager with a VNIC that tags outgoing traffic with the selected VLAN tag. Next, in step 445, the CMS 120 may configure a new uplink for the customer management network at the site of the new application manager. Alternatively, the CMS 120 may avoid establishing the new uplink until it is needed; for example, the CMS 120 may establish the uplink when another VM is established at a different site and that connects to the new customer management network.

The CMS 120 may notify the customer of the newly established application manager in step 450. In notifying the customer, the CMS 120 may send a message to the customer specifying how to communicate with the new application manager such as, for example, identifying an IP address of a gateway device that may be used to communicate with the new application manager or an identification of the VPN supporting the customer management network that the customer may subsequently join. The method 400 may then proceed to end in step 455.

FIG. 5 illustrates an exemplary method 500 for establishing an application virtual machine within a cloud. Exemplary method 500 may be performed by one or more of the components of exemplary network 100. For example, method 500 may be performed solely by the CMS 120, by the CMS 120 and one or more application managers 131, 142. Further, one or more steps may be performed manually by a cloud administrator or other user. For the purposes of illustration, the operation of method 500 will be described as being performed by CMS 120; various modifications for performance by other devices will be apparent.

Method 500 may begin in step 505 and proceed to step 510 where the CMS 120 may receive a request to establish a new VM from an application manager. The application manager may send such a request immediately on startup to deploy an application or after deciding to scale up a deployed application. The request may include a request for IaaS. In response to the request, the CMS 120 may, in step 515, provision a new application VM within the cloud. For example, the CMS 120 may locate and set aside hardware resources within the cloud, on which the application manager may install the appropriate application VM software.

Then, in step 520, the CMS 120 (or application manager) may begin to attach the new VM to the appropriate customer management network by identifying the customer management network associated with the application manager. For example, if the customer management network is a VLAN, the CMS 120 may identify the VLAN tag associated with the customer management network of the application manager. Then, in step 525, the CMS 120 may configure the new application VM with a connection to the identified customer management network. For example, the CMS 120 may configure the new application VM with a VNIC and the VLAN tag identified in step 520.

The CMS 120 may determine whether a new uplink should be configured in step 530 by determining whether an uplink for the site of the new application VM already has an uplink. For example, the CMS 120 may determine whether any other application managers or application VMs already exist at the site of the new application VM. If so, the method 500 may proceed to step 540. Otherwise, the CMS 120 may, in step 535, configure the new uplink by configuring a switch at the site of the new application manager to forward messages tagged for the customer management network to any other sites that also belong to the customer management network. Step 535 may also include updating the configurations of any existing uplinks for the customer management network to forward traffic to the site of the new application VM. This step may include directly interfacing with the respective switches or sending commands to a network management system (NMS) (not shown). Alternatively, the CMS 120 may avoid establishing the new uplink until it is needed; for example, the CMS 120 may establish the uplink when another VM is established at a different site and that connects to the customer management network.

The CMS 120 may notify the application manager or customer of the newly established application VM in step 540. Thereafter, the customer or application manager may be free to configure any customer networks 270, 280, 290 between the various application VMs as is appropriate to the specific applications. These customer networks may be established according to any methods such as, for example, the VLAN and other VPN configuration methods described herein. The method 500 may then proceed to end in step 545.

Figure 6:
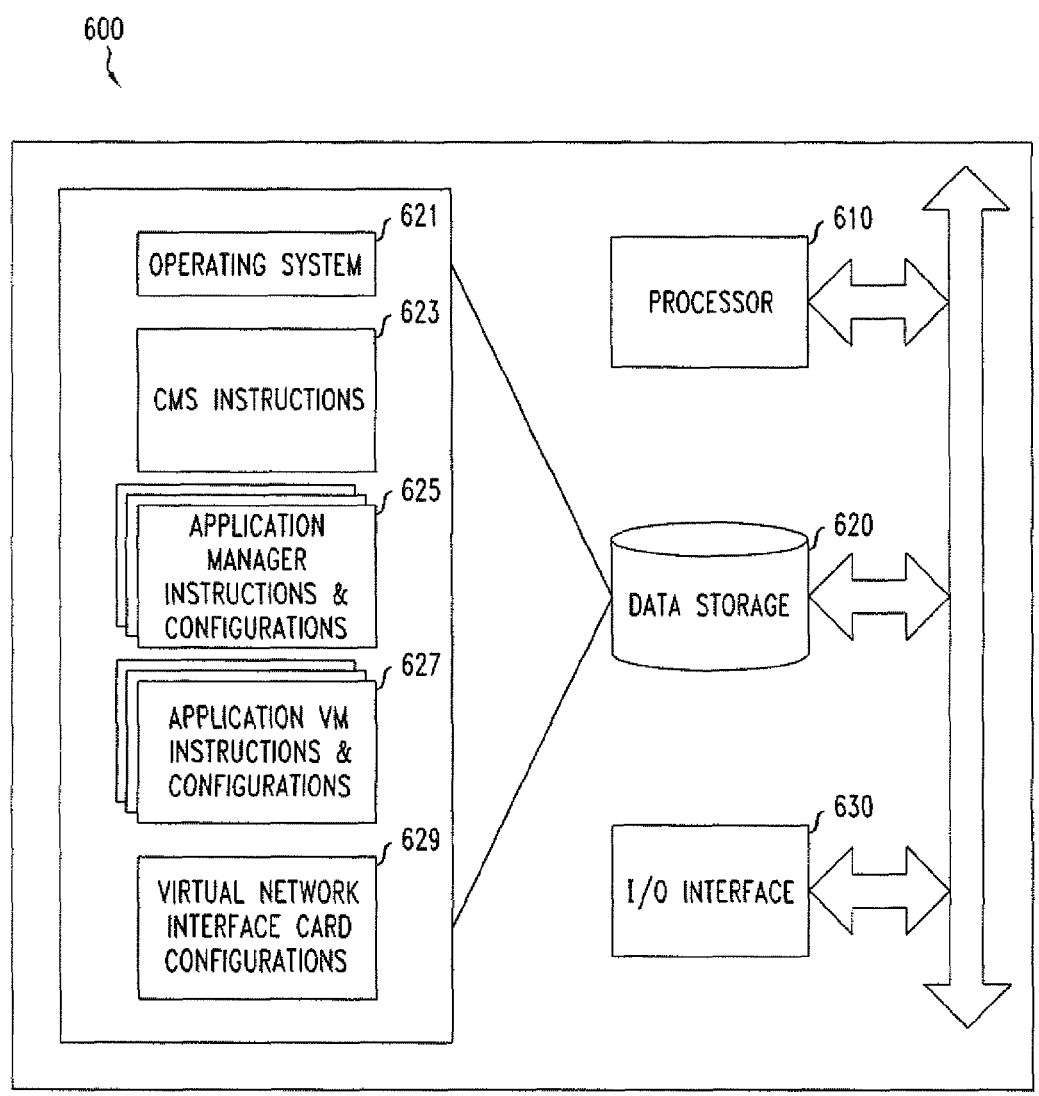
FIG. 6 illustrates an exemplary component diagram for hardware underlying a cloud-based architecture.

FIG. 6 illustrates an exemplary component diagram for hardware 600 underlying a cloud-based architecture. The hardware 600 may correspond to a standalone CMS 120 or any of the components 312, 314, 316, 322, 324, such as server blades, that support the various VMs described herein. The hardware 600 may include a processor 610, a data storage 620, and an input/output (I/O) interface 630.

The processor 610 may control the various operations of the hardware 600 and cooperate with the data storage 620 and the I/O interface 630, via a system bus. As used herein, the term "processor" will be understood to encompass a variety of devices such as microprocessors, field-programmable gate arrays (FPGAs), application-specific integrated circuits (ASICs), and other similar processing devices.

The data storage 620 may store program data such as various programs useful in implementing the functions described above. For example, the data storage 620 may store an operating system 621 for managing the various hardware resources and providing common services to other instruction sets executed by the processor 610. In some embodiments, wherein the hardware 600 supports various virtual machines, the operating system 621 may also include a hypervisor for managing the VMs.

In some embodiments, the data storage 620 may also store CMS instructions 623 for implementing the functions of a CMS as described above. In some embodiments, the data storage 620 may additionally or alternatively store one or more sets of application manager instructions 625 and application VM instructions 627 for providing the functions associated with such devices described above. These instructions may be installed by a CMS, application manager, or customer via the I/O interface and hypervisor in the operating system 621.

The data storage 620 may also include various VNIC configurations 629. For example, where various VPNs are implemented as VLANs, the VNIC configurations may include definitions of logical interfaces and identifications of VLAN tags. When present, the CMS instructions 623, application manager instructions 625, or application VM instructions 627 may include instructions or configurations to forward all traffic via one or more of the logical interfaces defined by the VNIC configurations 629. In doing so, the respective instructions may modify the messages to include any appropriate VPN tags and then forward the messages via the I/O interface 630.

The I/O interface 630 may cooperate with the processor 610 to support communications over one or more communication channels. For example, the I/O interface 610 may include a user interface, such as a keyboard and monitor, and/or a network interface, such as one or more Ethernet ports.

In some embodiments, the processor 610 may include resources such as processors/CPU cores, the I/O interface 630 may include any suitable network interfaces, or the data storage 620 may include memory or storage devices such as magnetic storage, flash memory, random access memory, read only memory, or any other suitable memory or storage device. Moreover the hardware 600 may be any suitable physical hardware configuration such as: one or more server(s), blades including components such as processor, memory, network interfaces or storage devices.

According to the foregoing, various embodiments enable communication between various cloud components and customers without exposing the cloud components to a public network. By establishing the various private networks disclosed herein, the cloud components may be geographically distributed and still intercommunicate without requiring a public IP or other public presence on the public network. Additional benefits will be apparent in view of the foregoing.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for establishing a cloud application comprising:
   receiving, by a cloud management system, a request for application deployment;
   provisioning a new application manager within a cloud computing system based on the request, wherein the new application manager is a device that manages an application by requesting provision of infrastructure from the cloud management system and configuring the provisioned infrastructure to implement respective features of the application;
   configuring the new application manager to belong to a first virtual private network (VPN), wherein the cloud management system also belongs to the first VPN; and
   configuring the new application manager to belong to a second VPN,
   wherein the new application manager is configured to send and receive data messages via the first VPN and the second VPN.

2. The method of claim 1, further comprising:
   receiving, by a cloud management system, an additional request for application deployment;
   provisioning an additional new application manager within the cloud computing system;
   configuring the additional new application manager to belong to the first virtual private network (VPN); and
   configuring the additional new application manager to belong to a third VPN,
   wherein the new application manager is configured to send and receive data messages via the first VPN and the third VPN.

3. The method of claim 1, further comprising:
   configuring a new VPN uplink for at least one of the first VPN and the second VPN at a site of the new application manager.

4. The method of claim 1, further comprising:
   providing a gateway to a public network; and
   configuring the new application manager to transmit messages bound for the public network to the gateway via the first VPN.

5. The method of claim 1, further comprising:
   provisioning a first new application virtual machine (VM) within the cloud computing system; and
   configuring, through at least one configuration operation, the first new application VM to belong to each of a first set of VPNs, wherein the second VPN belongs to the first set of VPNs,
   wherein the first new application VM is configured to send and receive data messages via the first set of VPNs.

6. The method of claim 5, wherein the first set of VPNs includes at least one additional VPN other than the second VPN, the method further comprising:
   provisioning a second new application VM within the cloud computing system; and
   configuring, through at least one configuration operation, the second new application VM to belong to each of a second set of VPNs, wherein the second VPN and the additional VPN also belong to the second set of VPNs,
   wherein the second new application VM is configured to send and receive data messages via the second set of VPNs.

7. The method of claim 6, further comprising:
   configuring a first new VPN uplink for the additional VPN at a site of the first new application VM, and
   configuring a second new VPN uplink for the additional VPN at a site of the second new application VM.

8. A cloud management system comprising:
   a memory; and
   a processor in communication with the memory, the processor being configured to:
   receive a request for application deployment;
   provision a new application manager within a cloud computing system based on the request, wherein the new application manager is a device that manages an application by requesting provision of infrastructure from the cloud management system and configuring the provisioned infrastructure to implement respective features of the application;
   configure the new application manager to belong to a first virtual private network (VPN), wherein the cloud management system also belongs to the first VPN; and
   configuring the new application manager to belong to a second VPN,
   wherein the new application manager is configured to send and receive data messages via the first VPN and the second VPN.

9. The cloud management system of claim 8, wherein the processor is further configured to:
   receive an additional request for application deployment;
   provision an additional new application manager within the cloud computing system;
   configure the additional new application manager to belong to the first virtual private network (VPN); and
   configure the additional new application manager to belong to a third VPN, wherein the new application manager is configured to send and receive data messages via the first VPN and the third VPN.

10. The cloud management system of claim 8, wherein the processor is further configured to:
configure a new VPN uplink for at least one of the first VPN and the second VPN at a site of the new application manager.

11. The cloud management system of claim 8, wherein the processor is further configured to:
configure the new application manager to transmit messages bound for a public network to a gateway device via the first VPN.

12. The cloud management system of claim 8, wherein the processor is further configured to:
provision a first new application virtual machine (VM) within the cloud computing system; and
configure, through at least one configuration operation, the first new application VM to belong to each of a first set of VPNs, wherein the second VPN belongs to the first set of VPNs,
wherein the first new application VM is configured to send and receive data messages via the first set of VPNs.

13. The cloud management system of claim 12, wherein the first set of VPNs includes at least one additional VPN other than the second VPN, wherein the processor is further configured to:
provision a second new application VM within the cloud computing system; and
configure, through at least one configuration operation, the second new application VM to belong to each of a second set of VPNs, wherein the second VPN and the additional VPN also belong to the second set of VPNs,
wherein the second new application VM is configured to send and receive data messages via the second set of VPNs.

14. A non-transitory machine-readable storage medium encoded with instructions for establishing a cloud application comprising:
instructions for receiving, by a cloud management system, a request for application deployment;
instructions for provisioning a new application manager within a cloud computing system, wherein the new application manager is a device that manages an application by requesting provision of infrastructure from the cloud management system and configuring the provisioned infrastructure to implement respective features of the application;
instructions for configuring the new application manager to belong to a first virtual private network (VPN), wherein the cloud management system also belongs to the first VPN; and
instructions for configuring the new application manager to belong to a second VPN,
wherein the new application manager is configured to send and receive data messages via the first VPN and the second VPN.

15. The non-transitory machine-readable storage medium of claim 14, further comprising:
instructions for receiving, by a cloud management system, an additional request for application deployment;
instructions for provisioning an additional new application manager within the cloud computing system based on the request;
instructions for configuring the additional new application manager to belong to the first virtual private network (VPN); and
instructions for configuring the additional new application manager to belong to a third VPN,
wherein the new application manager is configured to send and receive data messages via the first VPN and the third VPN.

16. The non-transitory machine-readable storage medium of claim 14, further comprising:
instructions for configuring a new VPN uplink for at least one of the first VPN and the second VPN at a site of the new application manager.

17. The non-transitory machine-readable storage medium of claim 14, further comprising:
instructions for providing a gateway to a public network; and
instructions for configuring the new application manager to transmit messages bound for the public network to the gateway via the first VPN.

18. The non-transitory machine-readable storage medium of claim 14, further comprising:
instructions for provisioning a first new application virtual machine (VM) within the cloud computing system; and
instructions for configuring, through at least one configuration operation, the first new application VM to belong to each of a first set of VPNs, wherein the second VPN belongs to the first set of VPNs,
wherein the first new application VM is configured to send and receive data messages via the first set of VPNs.

19. The non-transitory machine-readable storage medium of claim 18, wherein the first set of VPNs includes at least one additional VPN other than the second VPN, the method further comprising:
instructions for provisioning a second new application VM within the cloud computing system; and
instructions for configuring, through at least one configuration operation, the second new application VM to belong to each of a second set of VPNs, wherein the second VPN and the additional VPN also belong to the second set of VPNs,
wherein the second new application VM is configured to send and receive data messages via the second set of VPNs.

20. The non-transitory machine-readable storage medium of claim 19, further comprising:
instructions for configuring a first new VPN uplink for the additional VPN at a site of the first new application VM, and
instructions for configuring a second new VPN uplink for the additional VPN at a site of the second new application VM.

* * * * *